United States Patent Office 3,717,488
Patented Feb. 20, 1973

3,717,488
HYDRATION OF SILICATES
Regis Marie Albert Magnan, Montelimar, France, assignor to Societe Anonyme Ciments la Farge, Paris, France
No Drawing. Filed Oct. 14, 1970, Ser. No. 80,782
Claims priority, application France, Dec. 15, 1969, 6943404
Int. Cl. C04b 7/02
U.S. Cl. 106—97                                                11 Claims

ABSTRACT OF THE DISCLOSURE

The invention relates to a process for hydration of silicates with a low calcium content—one mixes with 2 to 15% of portlant cement and 85 to 98% of synthetic monocalcium silicate having an analysis of 35 to 45% of $SiO_2$, 35 to 50% of CaO, 5 to 15% of $Al_2O_3$, and up to 6% in all of alkali and alkaline earth metal oxide, $Fe_2O_3$, and other oxides, whilst maintaining a water/solids ratio of 0.10 to 0.4 and autoclaving the mixture at a temperature of 100 to 250° C. under a steam pressure of 1 to 40 bars.

The present invention relates to a process for the hydration of silicates with a low calcium content. It also relates to the hydrated monocalcium silicates so obtained as well as the mortars prepared and the various industrial applications of these products.

The applicant has previously developed a synthetic silicate which forms the subject of French Pat. No. 1,584,873 for: "New monocalcium silicate, process for its manufacture and its applications." This synthetic silicate, which is designated in the said patent by the abbreviation CS may be obtained in the form of a product which is either vitreous or crystalline according to the type of cooling to which the initial mixture is subjected: The said CS has an oxide analysis of 45 to 60% silica, 30 to 45% lime and 0 to 15% of alumina, the last being present in the form of aluminium silicate or in the form of a silicate of calcium and aluminium, and may contain 0 to 3% of iron oxide with, also in the form of silicates, about 0 to 3% of magnesia and about 0 to 6% of $K_2O$ and/or$Na_2O$, the silica/lime ratio being between 1 and 2 and preferably in the vicinity of 1.5. The CS has on the whole the properties of wollastonite or of pseudowollastonite and makes it possible, by the addition of aluminous cement, to obtain compressed concretes or mortars which may be used in the casting of moulded articles or the manufacture of simple shaped articles such as for example sanitary ware and tiles, using an appropriate value for the ratio W/C (water/cement).

It is known that the basis of the strength of portland cement is the formation of tobermorite or other hydrated silicates with a low calcium content during the hydration of the cement. The lime which is liberated at the same time offers little strength so long as it is not carbonated. On the other hand it is a deleterious element in certain respects contributing to the decomposition of concretes in pure waters, and the breakdown of portland cement concrete after heating. For this reason it would be of significance to find a product which only forms tobermorite when hydrated and this is a principal object of the present invention. It is also known that monocalcium silicate cement, as would be excepted, lacks any hydraulic properties, and that the synthesis of tobermorite may be carried out by suitable hydrothermal treatment of raw materials such as silica plus lime.

The first hydration tests carried out on synthetic monocalcium silicate not only confirmed that monocalcium silicate was effectively inert in relation to water under normal conditions, but they also showed on test-pieces made with a W/CS ratio equal to 0.15 that one obtained, after four hours in the autoclave at 215° C. and under 21 bars, the following strengths in bars: vitreous synthetic silicate (S/L ratio (silica lime) 1.13):20 bars; crystalline synthetic silicate (S/L ratio 1.13):10 bars.

The X-ray diffraction examination showed that in the case of the vitreous product there was a vitreous phase present and in the case of the crystallised product pseudowollastonite and parawollastonite were present.

The present invention is based on the principle of catalysing the hydration reaction of the monocalcium silicate by means of certain portland cements or similar products and of subjecting the mixture to a thermal treatment, stoving or preferably autoclaving. It has been found that for a fairly wide range of different conditions both as to materials (different synthetic monocalcium silicates, different portland cements, preferably with a high content of tricalcium silicate and advantageously very white, and different additives or auxiliaries, for example) as well as to procedures of treatment and utilisation, it was possible to obtain industrial materials providing inherently high strength and suitable for providing mortars endowed with exceptionally good qualities as compared with those of the mortars prepared from only the catalyst cements. Such results could not be obtained merely by use of the disclosure of the above mentioned French patent.

According to the invention, a process for the hydration of monocalcium silicates comprises intimately mixing with water 2 to 15% of portland cement and 85 to 98% of synthetic monocalcium silicate having an analysis of 35 to 45% of $SiO_2$, 35 to 50% of CaO, 5 to 15% of $Al_2O_3$, and up to 6% in all of alkali and alkaline earth metal oxide, $F_2O_3$, and other oxides, whilst maintaining a water/solids ratio of 0.10 to 0.4 and autoclaving the mixture at a temperature of 100 to 250° C. under a steam pressure of 1 to 40 bars.

It is found that, using portland cement, the lime contained in this cement is totally utilised during hydration to form tobermorite, without any free lime remaining, which fulfils one of the principal objects of the invention.

The synthetic silicate used, which may be of the vitreous type or of the crystallised type, is preferably manufactured by the process described in the above mentioned French patent. For the portland cement employed as catalyst, it is preferred to use those cements which are currently known as superwhite and comply approximately to the following analysis:

| | Percent |
|---|---|
| $SiO_2$ | 24.4 |
| $Al_2O_3$ | 1.2 |
| $Fe_2O_3$ | 0.3 |
| CaO | 71.4 |
| MgO | 1.2 |

It was observed that, generally speaking, better results were achieved using synthetic monocalcium silicates of the vitreous type than with the crystallised type, each type having the same silicate/lime ratio in the neighbourhood of 1.13. Alternative portland cements may of course be used as catalysts as well as monocalcium silicates having different silica/lime ratios.

The results mentioned above, which have been the subject of numerous confirmatory tests, are not obtained if one does not use both the catalyst and a thermal treatment (stoving or autoclaving). Microphotographs and X-ray diffraction analyses carried out on the hydrated products obtained according to the invention show quite clearly well-crystallised tobermorite, the maximum content of which is an object of the invention.

The mixture can be subjected to a moist stoving of a duration of not less than 3 hours at a temperature greater than 80° C. on the whole, the duration of the stoving has an effect on the strengths of the final products, but this action varies according to the silicate employed: for a high ratio of silica/lime the stoving may be relatively short (upwards of 3 hours); for a low ratio of silica/lime the stoving must be prolonged (upwards of 5 hours), with the benefit of higher strength figures for certain silicates.

It is also possible to subject the mixed product to autoclaving.

The higher the temperature of this autoclaving, within the limits hereinbefore indicated, the more final strengths increase.

It is also possible, after the wet stoving or autoclaving, to subject the products to a passage through a dry stove for a period of 2 to 10 hours at a temperature of 100 to 500° C.; this subsequent treatment has a favourable influence on the strengths of test-pieces of the product and confirms a high tobermorite content, especially in the case of the highest strength figures.

Besides portland cement, it is also possible to add to the synthetic silicate various supplementary additives of widely differing types, such as calcium chloride, $CaCl_2$, calcium nitrate $Ca(NO_3)_2$, potassium or sodium carbonate, lithium carbonate, gypsum or sodium fluosilicate. A preferred additive is gypsum, which shows optimum results when present to the extent of 2.5%; the actual addition of gypsum should preferably be between 2 and 5%.

The additive may comprise, in total or partial replacement of the gypsum referred to above, of calcium sulphate in the form of its semi-hydrate. The strengths obtained in the final product are then improved as compared with products containing only gypsum as an additive.

The particle size of the materials used is significant since this has an appreciable effect upon the strength of the products obtained. It is preferred to use finely divided materials, with 50% to 80% passing through a 30$\mu$ mesh. It has been found that the simultaneous grinding of the materials—silicate and catalyst(s)—was particularly advantageous as compared with mechanical or manual mixing of the different materials after grinding.

Various examples are given below which show the properties of products obtained according to the method of the invention using a vitrified monocalcium silicate possessing the following composition:

| | Percent |
|---|---|
| $SiO_2$ | 43.05 |
| CaO | 38.05 |
| $Al_2O_3$ | 11.90 |
| Alkalis | 4 |
| $Fe_2O_3$ | 0.7 | with a silica/lime ratio of 1.13/1.

When dissolved in water this material gave a pH of 11.03 and liberated 72 mg. of CaO per litre.

The properties of a mortar on the basis of a 50%–50% mixture of the said silicate and superwhite cement, as compared with a mortar made from superwhite cement alone are tabulated below.

Mortar according to standard P. 15–403

| | Binder | | |
|---|---|---|---|
| | Mixture [1] | | Superwhite |
| | Strength in bars | | |
| After a period of— | Flexure | Compression | Compression |
| 1 day | 8 | 30 | 180 |
| 2 days | 20 | 90 | 340 |
| 7 days | 37 | 185 | 510 |
| 28 days | 69 | 340 | 650 |

[1] 50% vitreous CS S/L=1.13; 2% rejected at 1.1 mm.; 50% superwhite portland cement.

Hydration tests on a mixture of the specified silicate and superwhite cement gave the following results: Mixture (80% vitreous CS S/L–1.13 (2% rejected at 0.1 mm.) 20% superwhite portland cement.

| | | Tests carried out | | |
|---|---|---|---|---|
| | | Strengths in bars | | X-ray diffraction: |
| Type of test pieces | Treatment of test pieces | Flexure | Compression | Examination |
| Micro-pellets [1] made from the mixture alone with a ratio water/mixture 0.15. | 15 hours in damp air at 20° C. plus 8 hours autoclaving, of which 4 hours were at 215° C. and 21 bars. | | 1,030 | $C_xSH$ [2] |
| Standard mortar (standards P15–403) with the mixture for binder. | {24 hours plus 8 hours in damp air at 20° C. {24 hours in damp air at 20° C. plus 8 hours autocalaving, of which 4 hours at 215° C. and 21 bars. | 7 70 | 25 470 | |

[1] Keil-Mathieu method.
[2] Tobermorite line at 11.5 angstroms MgOSm.

Pellets for the tests, with a cross-section of 1 cm.[2], with a height of 1 cm., were formed under a pressure of 500 bars. A water-mixture ratio of 0.15 was generally used.

A comparison between the behaviour of the vitreous and crystallised silicates is given by the folowing table.

| Designation of the binder | Strengths in bars | | | |
|---|---|---|---|---|
| | Pure paste with $W/C=0.29$ | | Mortar according to standard P 15-403 ($W/C=0.5$) | |
| | Flexure | Compression | Flexure | Compression |
| Mixture: | | | | |
| 95% vitreous CS of 60%<40µ S/L=1.13 (5% superwhite) | 200 | 875 | 90 | 685 |
| 95% vitreous CS with 95% CS crushed with 60%<40µS/L=1.3 (5% superwhite) | 125 | 430 | 35 | 180 |
| 95% CS crystallised 95% CS crushed to 60%<40µS/L=1.3 (5% superwhite) | 65 | 215 | 20 | 95 |
| Superwhite | 135 | 450 | 110 | 735 |

The following test results indicate the combined influences:

(1) of the type of CS (vitreous or crystallised)
(2) of the silica/lime ratio of the CS
(3) of the rate of addition:
   (a) of superwhite cement
   (b) of soda on the strengths after autoclaving. (Tests on micro-testpieces made with W/C=0.15, autoclaved for 4 hours at 215° C. at a pressure of 21 bars.)

Characteristics of the CS tested

| | | Type | | |
|---|---|---|---|---|
| | | Vitreous | Vitreous | Crystallised |
| | | Silica lime ratio | | |
| Products added to the CS | Percent in the mixture | 1.0 | 1.3 | 1.3 |
| | | Compression strengths (in bars) | | |
| Superwhite cement | 1 | 200 | 190 | 200 |
| | 3 | 720 | 320 | 260 |
| | 5 | 1,120 | 550 | 510 |
| Ca(OH)₂ | 1 | 540 | 320 | 340 |
| | 5 | 670 | 450 | 350 |

| Particle size of the CS | Particle size of the superwhite cement | Particle size of the mixture | Method of preparing mixture grinding the two products together | Strength (in bars) |
|---|---|---|---|---|
| | | Less than 30µ 60% | Supergrinding of the mixture indicated above admixture carried out manually by means of a trowel. | 590 |
| | | Very fine | do | 850 |
| Above 40µ 100% | Below 30µ 60% | | do | 200 |
| Less than 40µ 100% | | Less than 40µ 100% | do | 460 |
| Less than 30µ 60% | | Very fine | do | 525 |

It will be seen that the rate of addition of white cement may be quite low, 5%, and that the addition of Ca(OH)₂ does not have the same function as the addition of portland cements.

The action of gypsum is illustrated by the table below.

| | | Strengths in bars | | |
|---|---|---|---|---|
| Nature of the added product | Percent present | After damp stoving at 95° C. for 15 hours | 60 hours | 86 hours |
| None | 0 | 475 | | 510 |
| Pure gypsum | 1 | 495 | | 565 |
| | 2 | | 655 | 665 |
| | 2.5 | 605 | | 700 |
| | 3 | | 645 | 650 |
| | 5 | 545 | | 640 |
| Calcium anhydrite¹ | 1 | 500 | | 560 |
| | 2.5 | 515 | | 565 |
| | 4 | | 690 | 660 |
| | 5 | 575 | | 620 |
| | 6 | | 695 | 765 |

¹ Gypsum containing ≃7.0% limestone burnt at 1,000° C.

The action of $Na_2SO_4$, $K_2SO_4$, $CaSO_4$, $0.5H_2O$ is illustrated by the following table.

| Composition of the mixture tested | | | Strength (bars) after wet stoving for 15 hrs. |
|---|---|---|---|
| 92.5% CS (silica/lime ratio 0.8) plus 7.5% superwhite cement, percent | Other products in the mixture | | |
| | Compound | Percent | |
| 100 | | | 745±12 |
| 97.5 | Na₂SO₄ | 2.5 | 775±17 |
| 97.5 | K₂SO₄ | 2.5 | 755±16 |
| 97.5 | Semihydrated | 2.5 | 965±33 |
| 97.5 | Gypsum | 2.5 | 848±20 |
| 96.55 | {Gypsum<br>{Na₂SO₄ | 2.45<br>1 | 872±28 |
| 96.55 | {Gypsum<br>{K₂SO₄ | 2.5<br>1 | 823±47 |

Calcium sulphate in the form of the semi-hydrate appears to be the best additive.

The influence of the particle size of the components of a mixture of 92.5% vitreous CS (silica/lime ratio 1.13) and
7.5% superwhite cement, and of the mode of preparing the mixture, on the strength of the product after 60 hours damp stoving at 95% C. (pellets manufactured with W/C ratio=0.15), is illustrated by the following table:

The influence of the silica/lime ratio of the CS and of the temperature of quenching of the mixture on the strength of micro-testpieces of a mixture of 92.5% CS and 7.5% superwhite cement with 15% of water after damp stoving at 95° for 15 hours.

| | 15 hours damp stoving (n=9) | | 15 hours damp stoving plus 2 hours at 500° (n=6) | | 15 hours damp stoving plus 24 hours drying at 95° | |
|---|---|---|---|---|---|---|
| | m | σ' | m | σ' | m | σ' |
| After 1,500° (quenching) | 562.2 | 15.5 | 1,158.3 | 110.3 | 853 | 38.6 |
| After 1,300° (quenching) | 525.2 | 29.5 | 1,096.6 | 45.7 | 790 | 14.1 |
| After 1,100° (quenching) | 546.6 | 39.7 | 995 | 59.1 | 796.6 | 53.0 |
| After S/L=1.0 | 568.9 | 12.8 | 1,123.3 | 86.9 | 823 | 47.8 |
| After S/L=1.13 | 535.5 | 33.4 | 1,115.0 | 104.3 | 838.6 | 40.2 |
| After S/L=1.3 | 530.0 | 34.6 | 1,011.6 | 72.0 | 780 | 35.6 |

NOTE.—n is the number of testpieces, m is the mean compressive strength in bars and σ' is the typical discrepancy.

Tests were carried out on a cement corresponding to the following formula:

CS (of the above mentioned type) _____percent by wt__ 90.2
White cement of the above mentioned type _____percent__ 7.3
Gypsum _____do____ 2.5
Fineness: 65% particles _____<30µ

The whiteness of the mixture reckoned against the lightness index β=83%.

Using this mixed cement, with mortar compositions have different W/C ratios, tests were carried out using both stoving and by autoclaving.

| Composition | Water/binder ratio | Sand/binder ratio | Seine sand 0–0.16, percent | 0.16–0.63, percent | 0.63–1.25, percent | 1.25–2.5, percent | Treatment | Flexural strength | Compression | Setting |
|---|---|---|---|---|---|---|---|---|---|---|
| 1 | 0.33 | 3 | 12 | 32 | 38 | 18 | Stoving, 95° C., 15 hours | 48 | 200 | Vibrating table. |
| 2 | 0.50 | 3 | 25 | 25 | 20 | 29 | Stoving, 95° C., 6 hours | 42 | 250 | Ramping. |
| 3 | 0.30 | 2 | 25 | 25 | 21 | 29 | Autoclaving, 3 hours, 215° C | | 860 | Do. |
| 4 | 0.30 | 2 | 25 | 25 | 21 | 29 | (¹) | | 950 | Do. |

¹ After one month in damp air at 20° C.

Using prisms formed from composition (2), taking as initial measurements the length of the sample after treatment and after cooling;

it was found after 45 days keeping in air at 20° C. and 50% RH
  with a sample treated by stoving, there was a shrinkage of 280 μ/m.
  with a sample of the same composition but autoclaved, there was an expansion of 40 μ/m.

The latter treatment therefore makes it possible to provide a mortar without hydraulic shrinkage.

On a sample composed and treated as per sample 3 of the table above, decomposition tests were carried out in different media. The results are summarised in the table which follows.

| | Strengths (bars) | Observations |
|---|---|---|
| Control prism after autoclaving | 860 | |
| Immersion in N/10 HCl: | | |
|   15 days | 770 | Prisms scoured on the surface on the 4 faces. |
|   1 month | 790 | |
|   3 months | 750 | |
| Immersion in N/10 NaOH: | | |
|   15 days | 890 | Prisms intact. |
|   1 month | 1,025 | |
|   3 months | 1,040 | |
| Immersion in MgSO₄: | | |
|   15 days | | |
|   1 month | 930 | Do. |
|   3 months | 1,000 | |
| Control prism kept in damp air: 1 month | 950 | Do. |
| Semi-immersion in MgSO₄:¹ | | |
|   1 month | | Do. |
|   3 months | | |

¹ 50 g./liter.

Of the testpiece which had been autoclaved and kept for 1 month in the air, the pH obtained by crushing it and dispersing the crushed paste in water was 11.0, which suggests a good protection of the reinforcement.

Other tests dealt with the resistance to decomposition of mortars manufactured according to the invention. These tests were carried out on prisms of mortar with dimensions of 2 × 2 × 10;

(1) By complete immersion
  in a N/10 HCl solution
  in a N/10 NaOH solution
  in a 50 g./l. solution of MgSO₄·7H₂O
  in pure water (2) By semi-immersion in a 50 g./l. solution of $$MgSO_4 \cdot 7H_2O$$

The composition of the mortar used in these tests was as follows:

500 g. of binder comprising:
  90% of monocalcium silicate with a silica/lime ratio 20 of 0.8 crushed to normal fineness
  7.5% of Lafarge Super-white cement
  2.5% of "Prolabo" gypsum
1000 g. of conglomerate comprising:
  250 g. of Lemanoy sand 0–0.16 mm.
  250 g. of fine Seine sand 0.16–0.63 mm.
  210 g. of medium Seine sand 0.62–1.25 mm.
  290 g. of coarse Seine sand 1.25–2.5 mm.

This mortar was mixed in a standardised Le Petit mixer with 150 g. of water giving a W/C ratio of 0.3. The appearance of the mortar was dry, but it bonded very well on tamping in a mould. It was taken out of the mould after 24 hours in a damp room and then autoclaved (standard ASTM cycle).

After autoclaving, the prisms gave 864 bars as the compression strength expressed in bars.

In the case of complete immersion in the specified solutions, the following results were obtained:

| | Compression strength | | | | |
|---|---|---|---|---|---|
| Immersion time after— | In ordinary water | In pure water | In N/10 HCl | In N/10 NaOH | In a 50 g./l. solution of MgSO₄·7 H₂O |
| 15 days | | | 773 | 892 | |
| 1 month | | | 790 | 1,025 | 930 |
| 3 months | 944 | 998 | 750 | 1,040 | 1,008 |
| 6 months | 965 | 978 | 691 | 1,044 | 1,042 |

One could therefore observe an excellent resistance in pure water, in the soda solution and in the solution of magnesium sulphate, as well as a good strength in acid solution, whereas:

A portland mortar would have been rapidly attacked if not destroyed by the acid, even though it would have stood up to the solution of soda. On the contrary, a mortar of Ciment fondu would have been attacked by the soda solution. According to its nature, a portland mortar would have stood up to a greater or lesser degree for 6 months in the solution of magnesium sulphate, although the Ciment fondu would have stood up very well.

In pure water all portland cements show a gradual fall in strength, as exemplified below.

| Example | Ordinary water | Pure water renewed every day |
|---|---|---|
| After 3 months | 756 | 703 |
| After 6 months | 777 | 646 |

The results obtained after semi-immersion of the test samples in a 50 g./l. solution of $MgSO_4 \cdot 7H_2O$ were as follows, as compared to samples using alternative binders.

| Binder used | Compression strength | | | | Appearance after 6 months |
|---|---|---|---|---|---|
| | After 3 months | | After 6 months | | |
| | Emergent part | Immersed part | Emergent part | Immersed part | |
| CS in accordance with invention | 828 | 1,008 | 908 | 1,042 | Absolutely intact, impeccable appearance of ceramic earthenware. |
| Control | 864 | | 864 | | |
| Ciment fondu | The strengths vary according to development, but there was no attack. | | | | No attack. |
| CPA 400 without $C_3A$ | 785 | 743 | 762 | 682 | No visible attack. |
| Control | 726 | | 794 | | |
| CPA 400 with very low $C_3A$ | 890 | 838 | 860 | 810 | No visible attack. |
| Control | 852 | | 859 | | |
| CPA 400 with high content of $C_3A$ | 806 | 760 | 752 | 640 | Breakdown of immersed part. |
| Control | 742 | | 788 | | |
| CLK | 564 | 580 | 520 | 557 | Slight attack of the emergent part visible. |
| Control | 502 | | 558 | | |

The table above show the superiority after 6 months of the prisms manufactured in accordance with the invention.

After 6 months the slag cements were attacked in the emergent part, whilst most of the portland cements and the cements on the basis of portland clinker are more or less attacked in the immersed part. Only the ciment fondu showed no attack.

The behaviour after 6 months and the structure of the prisms manufactured according to the invvention (they have the appearance of an extremely compact and smooth ceramic earthenware) confirms the long-term existence of strength figures higher than those of the best portland cements.

The various tests carried out show therefore that by operating according to the invention, using a synthetic monocalcium silicate, a white portland cement and possibly another additive such as gypsum, there can be obtained, either by autoclaving and/or by stoving, mortars of a light colour possessing very useful properties both as regards their mechanical and chemical strength and their dimensional stability.

The composition of the synthetic silicate, preferably vitrified, is not critical, the most advantageous composition being approximately $Al_2O_3$ 11%, $SiO_2$ 40%, lime 49%.

What I claim is:

1. A process for the hydration of monocalcium silicates comprising intimately mixing with water 2 to 15% of portland cement and 85 to 98% of synthetic monocalcium silicate having an analysis of 35 to 45% of $SiO_2$, 35 to 50% of CaO, 5 to 15% of $Al_2O_3$, and up to 6% in all of alkali and alkaline earth metal oxide, $Fe_2O_3$, and other oxides, whilst maintaining a water/solids ratio of 0.10 to 0.4, and stoving or autoclaving the mixture at a temperature of 100 to 250° C. under a pressure of 1 to 40 bars of water vapour.

2. A process according to claim 1, wherein the silica/lime ratio of the synthetic silicate is about 1.13.

3. A process according to claim 1, wherein the mixture is subjected to wet stoving for a period of 2 to 10 hours at a temperature of between 80° C. and 500° C. prior to a dry thermal treatment.

4. A process according to claim 1, wherein wet stoving is carried out for more than three hours, and the silica/lime ratio of the synthetic monosilicate is 2.

5. A process according to claim 1, wherein wet stoving is carried out for more than 5 hours, and the silica/lime ratio of the synthetic monosilicate is 1.

6. A process according to claim 1 wherein at least one supplementary additive is included in the mixture, same supplementary additive being selected from the group consisting of calcium chloride, calcium nitrate, potassium carbonate, sodium carbonate, lithium carbonate, calcium hydroxide, anhydrous calcium sulfate, sodium sulfate, potassium sulfate, semi-hydrated calcium sulfate, gypsum and sodium fluosilicate.

7. A process according to claim 6, wherein 2 to 5% of gypsum is added to the mixture.

8. A process according to claim 7, wherein at least a part of the gypsum is replaced by calcium sulphate in the form of its semi-hydrate 9. A process according to claim 1, wherein the particle size of the components of the mixture is such that 50 to 80% pass through a 30μ sieve.

10. A process according to claim 1, wherein the constituents of the mixture are ground together simultaneously.

11. A process according to claim 1, wherein the synthetic monosilicate has approximately the following analysis:

| | Percent |
|---|---|
| $Al_2O_3$ | 11 |
| $SiO_2$ | 40 |
| CaO | 49 |

References Cited

UNITED STATES PATENTS

| | | | |
|---|---|---|---|
| 3,505,439 | 4/1970 | Moorehead et al. | 106—120 |
| 3,501,324 | 3/1970 | Kubo | 106—120 |
| 3,616,116 | 4/1967 | Podschus | 106—120 |
| 2,547,127 | 4/1951 | Kalouseh | 106—120 |
| 2,534,303 | 12/1950 | Serinis | 106—120 |

FOREIGN PATENTS 1,584,873  1/1970  France.

OTHER REFERENCES

Taylor, W. H., "Concrete Technology and Practice," American Elsevier, pp. 28–31 (1965).

JAMES E. POER, Primary Examiner

U.S. Cl. X.R.

106—120